United States Patent
Leung et al.

(10) Patent No.: US 7,805,426 B2
(45) Date of Patent: Sep. 28, 2010

(54) DEFINING A WEB CRAWL SPACE

(75) Inventors: Tony Kai-chi Leung, San Jose, CA (US); Maxime Romain Tiran, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 11/763,299

(22) Filed: Jun. 14, 2007

(65) Prior Publication Data

US 2008/0313181 A1   Dec. 18, 2008

(51) Int. Cl.
*G06F 17/30* (2006.01)
(52) U.S. Cl. .................... 707/706; 707/765; 707/713
(58) Field of Classification Search .................. None
See application file for complete search history.

(56) References Cited

U.S. PATENT DOCUMENTS 6,411,952 B1   6/2002   Bharat et al.
2005/0086206 A1*   4/2005   Balasubramanian et al. ... 707/3
2005/0120292 A1*   6/2005   Suzuki ..................... 715/501.1
2006/0218143 A1   9/2006   Najork
2007/0208703 A1*   9/2007   Shi et al. ....................... 707/3

FOREIGN PATENT DOCUMENTS

WO   01/50320   7/2001

* cited by examiner

*Primary Examiner*—Khanh B Pham
*Assistant Examiner*—Johnese Johnson
(74) *Attorney, Agent, or Firm*—Janaki K. Davda; Konrad Raynes & Victor LLP (57) ABSTRACT

Provided are techniques for defining a web crawl space to be crawled. A seed list including one or more seed names is received from a user, wherein each seed name represents a website. In response to receiving the seed list, a web crawl space for the received seed list is generated by generating one or more allow rules.

9 Claims, 6 Drawing Sheets

DEFINING A WEB CRAWL SPACE

BACKGROUND

1. Field

Embodiments of the invention relate to define a web crawl space.

2. Description of the Related Art

The World Wide Web (also known as WWW or the "Web") is a collection of some Internet servers that support Web pages that may include links to other Web pages. A Uniform Resource Locator (URL) indicates a location of a Web page. Also, each Web page may contain, for example, text, graphics, audio, and/or video content. For example, a first Web page may contain a link to a second Web page. Thus, the Web may be described as a series of interconnected web pages with links connecting the web pages from different web sites together. A web site may be described as a related set of Web pages.

A Web browser is a software application that is used to locate and display Web pages. Currently, there are billions of Web pages on the Web.

A web search engine uses a web crawler (sometimes known as a spider) to retrieve web pages from the web. The web search engine then indexes the content of the crawled web pages to make them searchable by users. Web search engines are used to retrieve Web pages on the Web based on some criteria (e.g., entered via the Web browser). That is, Web search engines are designed to return relevant Web pages given a keyword query. For example, the query "HR" issued against a company intranet search engine is expected to return relevant pages in the intranet that are related to Human Resources (HR). The Web search engine uses indexing techniques that relate search terms (e.g., keywords) to Web pages.

A website may be described as a domain or a subdomain of a domain. Most websites are specified by names that may be called domain names, subdomain names or hostnames.

A typical web search engine crawls a "web crawl space". A web crawl space may be described as the Web or some portion of the Web. In order to define the web crawl space, the web search engine usually needs to know from an administrator where to start a crawl, often called a seed, and what the boundaries are for the crawl. That is, a webspace is typically defined by what to crawl (described by allow rules), what not to crawl (described by deny rules), and a seed list (which is a list of seed names (e.g., domain names) with which to start the crawl).

For example, the web site myexample.com may have the following structure:
en.myexample.com for English webpages,
zh.myexample.com for Chinese webpages,
es.myexample.com for Spanish webpages, In this example, www.myexample.com acts as a homepage that presents the user with a language of choice and directs the user to the appropriate subdomains. Furthermore, en.myexample.com may have the following structure:
en.myexample.com/archives for outdated stories,
en.myexample.com/current for current stories,
en.myexample.com/sports for sports related stories,
en.myexample.com/entertainment for the latest in Hollywood.

The following Example(1) describes a webspace that is defined by an allow rule and a deny rule with a seed list of one seed name www.myexample.com:

EXAMPLE 1 allow *.myexample.com
deny *

In Example(1), the webspace consists of everything with a URL that matches *.myexample.com. Everything under that URL is crawled. The deny rules says everything else will be denied. It is implicit in this rule set that allow rules takes precedence over deny rules, otherwise, no URL can be crawled. Example(2) describes a webspace for which the user wants to exclude old stories from being crawled with a seed list of one seed name www.myexample.com:

EXAMPLE 2 allow *.myexample.com/*
deny *.myexample.com/archives
deny *

In Example(2), the webspace now excludes all the articles under archives to be crawled and they won't be indexed.

Example(3) describes a webspace for which the user wants to crawl the sports stories with a seed list of one seed name www.myexample.com:

EXAMPLE 3 allow *.myexample.com/sports/*
deny *

Example(4) describes a webspace for which the user wants to crawl Chinese pages with a seed list of one seed name www.myexample.com:

EXAMPLE 4 allow *.myexample.com/*
deny zh.myexample.com/*
deny *

Having to specify all the rules and the seed list of one seed name becomes very confusing for novices who are not familiar with the Web. Most often, these novices just want to crawl a particular web site (i.e., a portion of the Web) without wanting to understand what the rules mean and why the rules are used. In practice, setting up the web crawl space to be crawled is difficult.

Thus, there is a need in the art for improved defining of a web crawl space to be crawled.

SUMMARY OF EMBODIMENTS OF THE INVENTION

Provided are a method, computer program product, and system for defining a web crawl space to be crawled. A seed list including one or more seed names is received from a user, wherein each seed name represents a website. In response to receiving the seed list, a web crawl space for the received seed list is generated by generating one or more allow rules.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
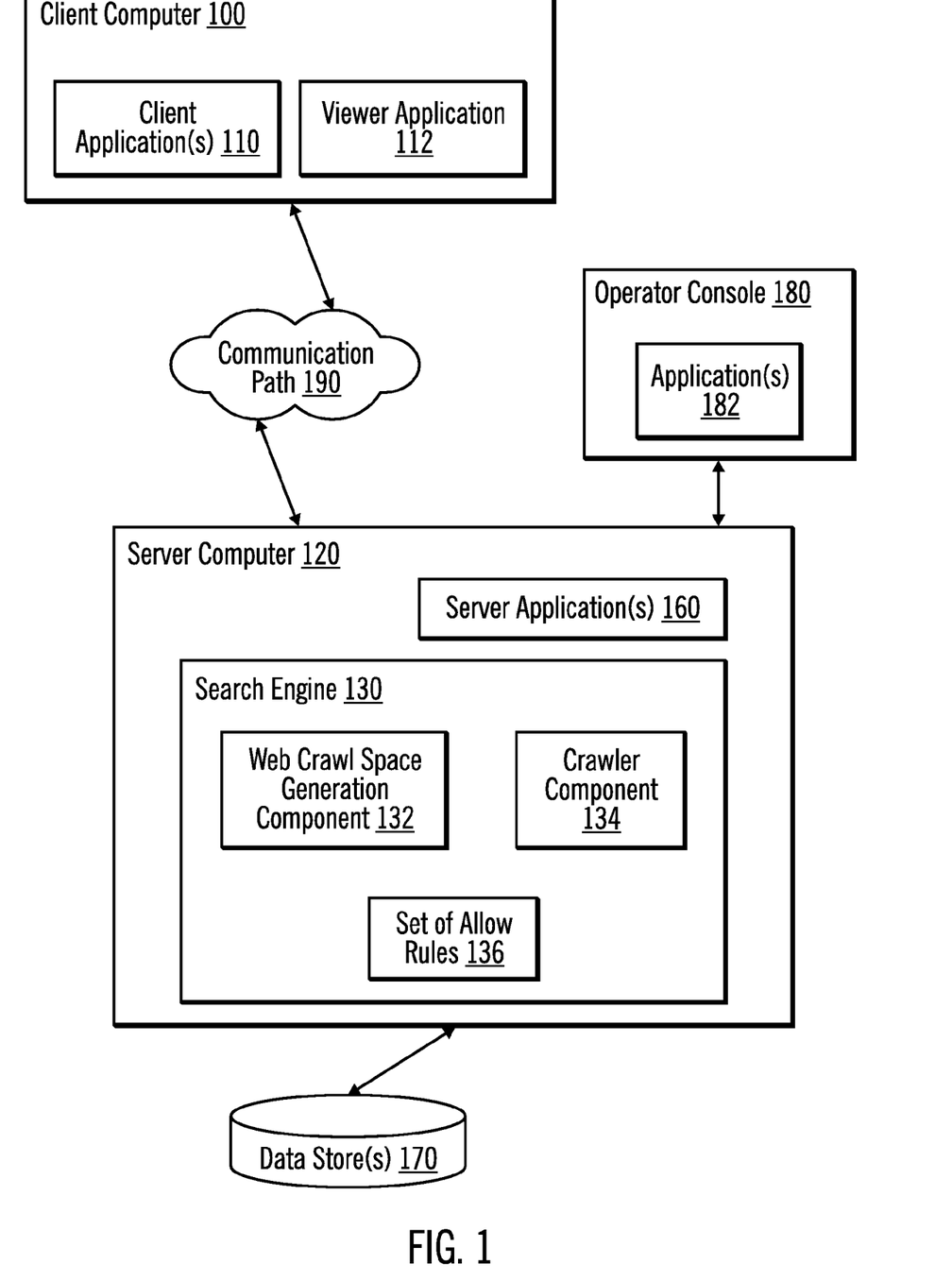
FIG. 1 illustrates, in a block diagram, a computing environment in accordance with certain embodiments of the invention.

FIG. 1 illustrates, in a block diagram, a computing environment in accordance with certain embodiments of the invention. A client computer 100 is connected via a communication path 190 to a server computer 120. The client computer 100 may comprise any computing device known in the art, such as a server, mainframe, workstation, personal computer, hand held computer, laptop telephony device, network appliance, etc. The communication path 190 may comprise, for example, any type of network, such as, a Storage Area Network (SAN), a Local Area Network (LAN), Wide Area Network (WAN), the Internet, an Intranet, etc. The viewer application 112 provides an interface that enables searching of a set of documents (e.g., stored in one or more data stores 170). In certain embodiments, the viewer application 112 is a Web browser.

A search engine 130 includes a web crawl space generation component 132 and a crawler component 134. The search engine 130 also includes a set of allow rules 136, and the set 136 includes one or more allow rules. Although components 132 and 134 are illustrated as separate components, the functionality of components 132 and 134 may be implemented in fewer or more or different components than illustrated. Additionally, the functionality of the components 132 and 134 may be implemented at a Web application server computer or other server computer that is connected to the server computer 120. Additionally, one or more server applications 160 may execute at server computer 120. The server computer 120 provides the client computer 100 with access to data in at least one data store 170 (e.g., a database). Although a single data store 170 is illustrated, for ease of understanding, data in data store 170 may be stored in data stores at other computers connected to server computer 120.

Also, an operator console 180 executes one or more applications 182 and is used to access the server computer 120 and the data store 170.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes data that is used with certain embodiments of the invention.

Embodiments automatically generate the rules (i.e., allow and deny rules) required to crawl certain websites. The generated rules enable a user to crawl a particular website without having to specify complex allow and deny rules.

Embodiments recognize that most websites are specified by names that may be called domain names, subdomain names or hostnames. Many websites have a two part name in the United States and three part name in other parts of the world. Example domain names include cnn.com, ibm.com or amazon.co.uk. The last part of the domain name (e.g., .com) may also be referred to as a top level domain name. When a user thinks of a website, the user is most likely thinking of the two or three part name associated with the website. In addition, many websites include subdomains, which are different parts of websites, broken down by subject areas. Examples of subdomain names for the domain name cnn.com are: sports.cnn.com and money.cnn.com. Furthermore, when a user looks at the name www.cnn.com, the user may think of it as the entire website, instead of being very specific to www.cnn.com. For example, the user may believe that crawling www.cnn.com should include crawling money.cnn.com as well. With embodiments, such subdomains (e.g., money.cnn.com) are included in a crawl when the user specifies a two or three part name.

Figure 2:
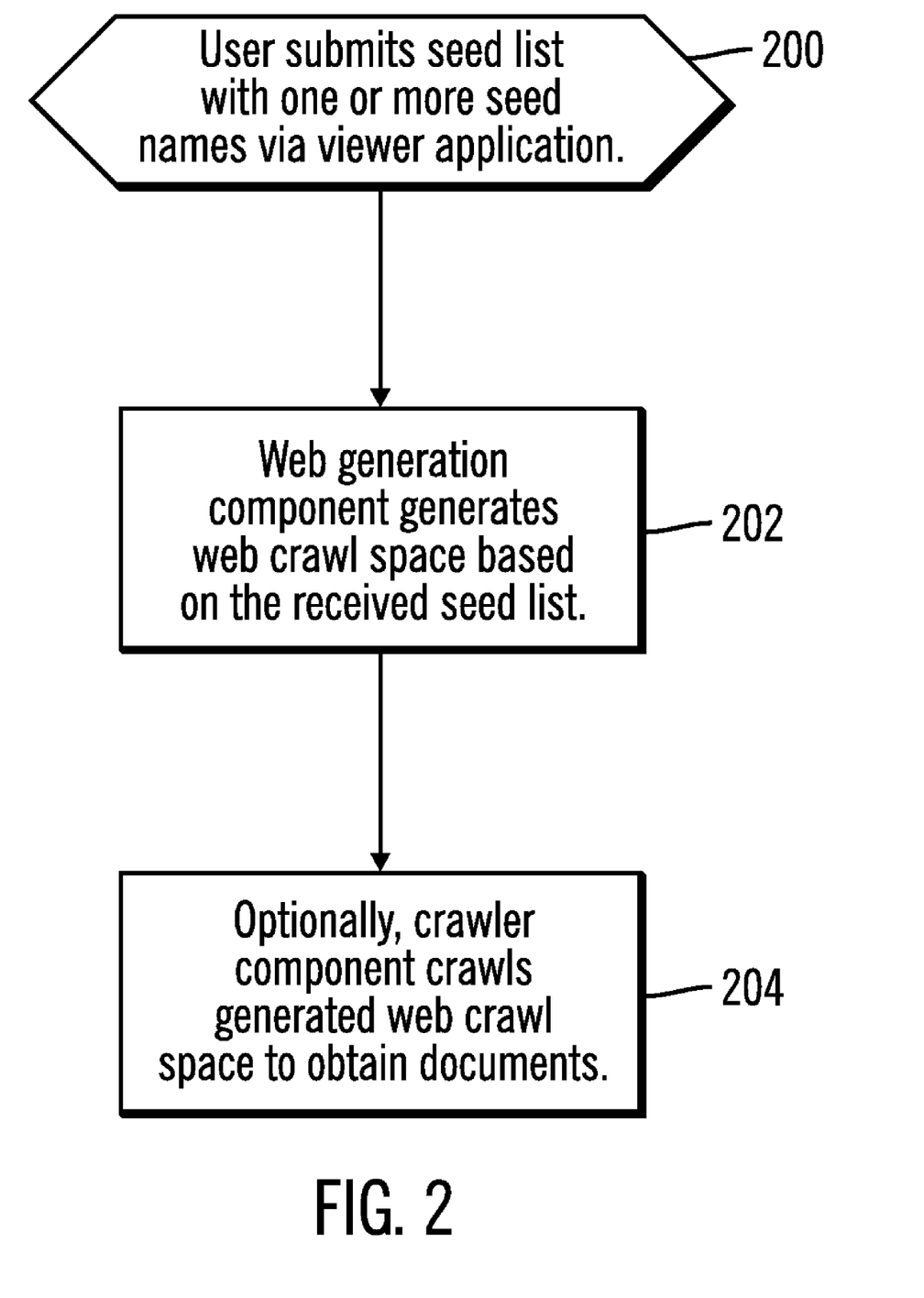
FIG. 2 illustrates logic for defining a web crawl space in accordance with certain embodiments.

FIG. 2 illustrates logic for defining a web crawl space in accordance with certain embodiments. Control begins with block 200 with a user submitting a seed list with one or more seed names (e.g., where each seed name represents a website with a two part name or three part name) via the viewer application 112. In block 202, the web generation component 132 generates a web crawl space based on the received seed list. In block 204, optionally, the crawler component 134 crawls the generated web crawl space to obtain documents. These documents may subsequently be indexed and searched.

Figure 3:
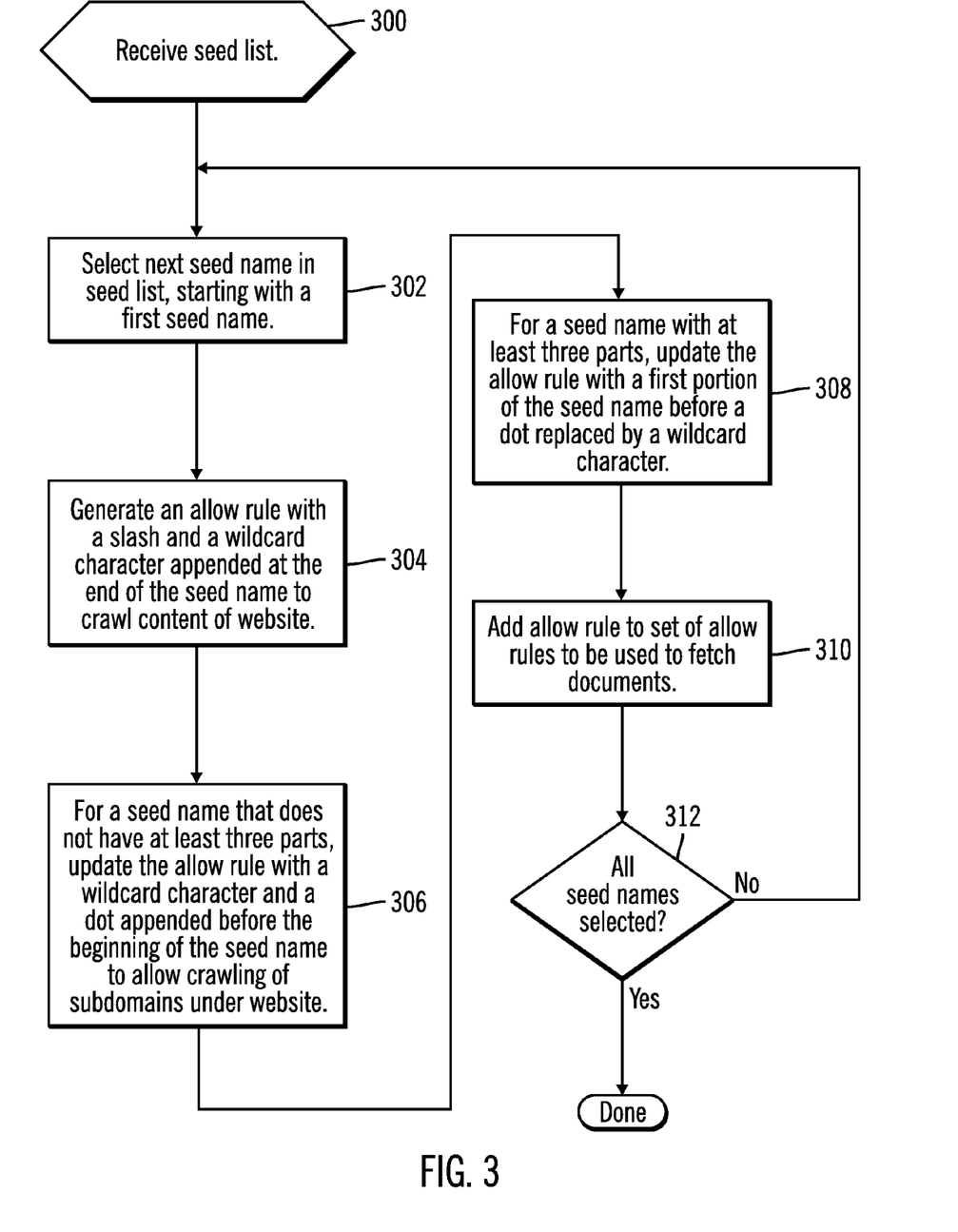
FIG. 3 illustrates logic for generating rules for a web crawl space in accordance with certain embodiments.

FIG. 3 illustrates logic for generating rules for a web crawl space in accordance with certain embodiments. Control begins at block 300, with the web crawl space generation component 132 receiving a seed list. In block 302, the web crawl space generation component selects the next seed name in the seed list, starting with a first seed name. In block 304, the web crawl space generation component 132 generates an allow rule with a slash (/) and a wildcard character (*) appended at the end of the seed name to crawl the content of a website. For example, for the website name x.com, the web crawl space generation component 132 adds a slash and a wildcard character at the end of the seed name to form "x.com/*".

In block 306, for a seed name that does not have at least three parts, the web crawl space generation component 132 updates the allow rule generated in block 304 with a wildcard character (*) and a dot (.) appending before the beginning of the seed name to allow crawling of subdomains under the website. For example, for the website name x.com, the web crawl space generation component 132 appends an asterisk and a dot to form "*.x.com", which allows crawling everything under the website. For this allow rule, the wildcard character indicates that any name, such as y.x.com, is allowed.

In block 308, for a name with at least three parts (e.g., amazon.uk.com or sports.cnn.com), the web crawl space generation component 132 updates the allow rule generated in block 304 with a first portion of the seed name before a dot replaced by a wildcard character (*). For example, if the user specifies the website name www.x.com, the web crawl space generation system 132 generates an allow rule by rewriting the name to "*.x.com". Also, if the user specifies the name, w3.x.com, the web crawl space generation system 132 generates an allow rule by rewriting the name to "*.x.com".

With the all of the appropriate rules applied to the website name, for a website name of x.com, the website generation system 132 generates the allow rule "*.com/*".

In block 310, the web crawl space generation component 132 adds the allow rule to a set of allow rules to be used to fetch documents. In block 312, the web crawl space generation component 132 determines whether all seed names have been selected. If so, processing ends, otherwise, processing loops back to block 302 to select another seed name.

Figure 4:
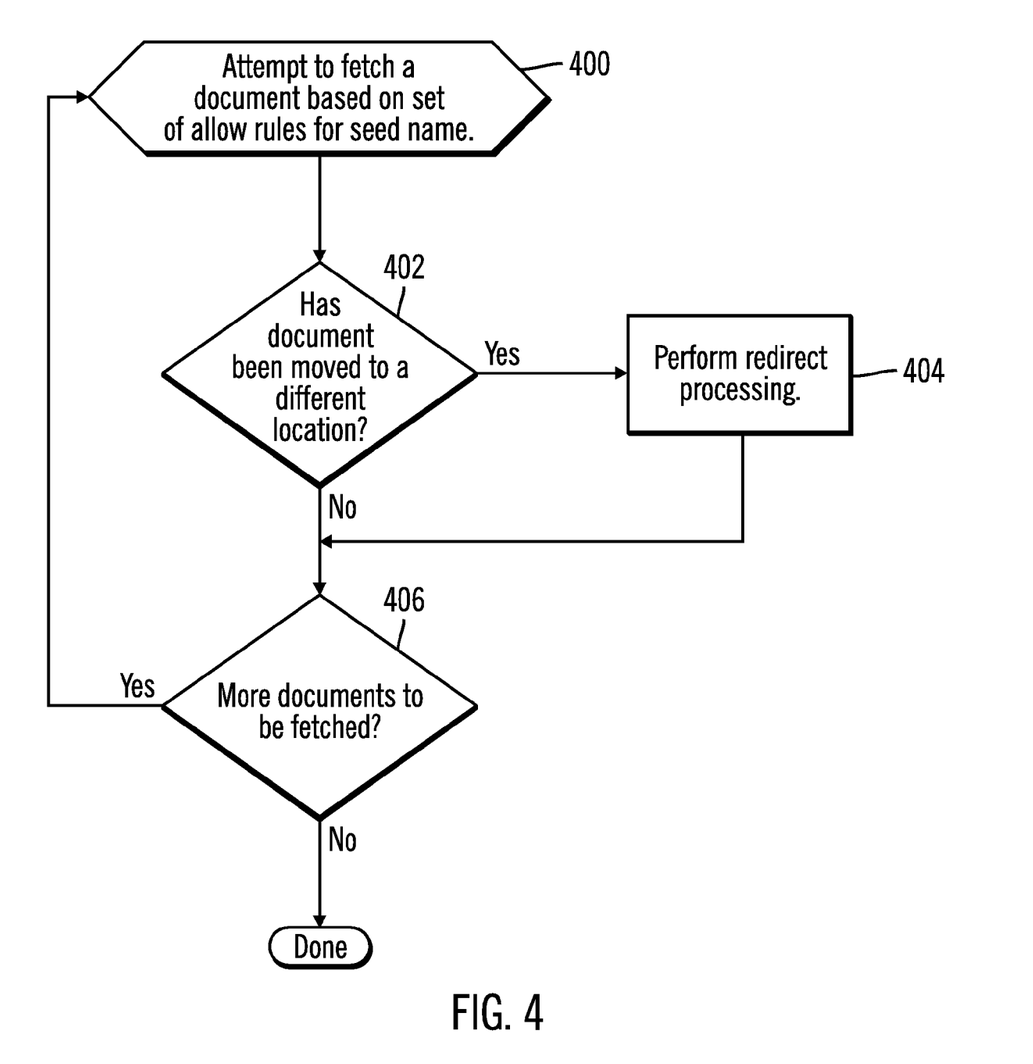
FIG. 4 illustrates logic for fetching documents in accordance with certain embodiments.

FIG. 4 illustrates logic for fetching documents in accordance with certain embodiments. Control begins at block 400 with the crawler component 134 attempting to fetch a document based on the set of allow rules 136 for the seed name. In block 402, the crawler component 134 determines whether the document has been moved to a different location. If so, processing continues to block 404, otherwise, processing continues to block 406. In block 404, redirect processing is performed (which is described further with reference to FIG. 5). In block 406, the crawler component 135 determines whether there are more documents to be fetched. If so, processing loops back to block 400, otherwise, processing is done.

Figure 5:
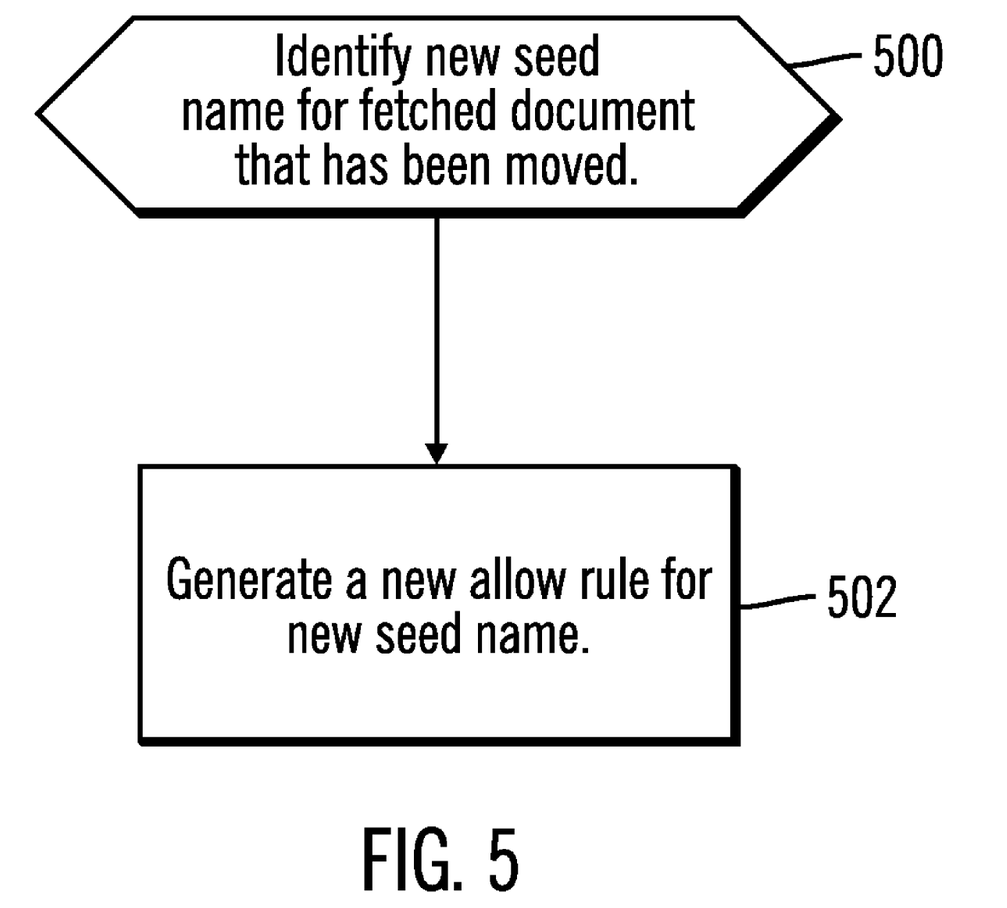
FIG. 5 illustrates logic for redirect processing in accordance with certain embodiments.

FIG. 5 illustrates logic for redirect processing in accordance with certain embodiments. Control begins at block 500 with the crawler component 134 identifying a new seed name (e.g., a URL of a website) for the fetched document that has been moved. In block 502, the web crawl space generation component 132 generates a new allow rule for the seed name using the processing described with reference to FIG. 3, resulting in a new allow rule being added to the set of allow rules 136.

In addition to adding wildcards to the seed name to compose an allow rule for web crawling, embodiments also recognize website name redirects to handle websites that redirect users to a different website. Some web sites maintain multiple domain names that point to the same website content. For example, the website name www.abcd.com may redirect users to www.abcd.org. This helps users who are confused between different domain hierarchies, such as .org and .com, find what they are looking for. As an example of a more radical redirect, the website name www.abcd.com may redirect users to someotherwebsitename.com. Embodiments handle redirection to generate the proper allow rule so that an administrator does not have to check these redirects manually to enter the correct seed. With embodiments, an administrator may input any seed name (e.g., URL) that works for them, and the web crawl space generation component 132 and crawler component 134 generate a set of allow rules 136.

Thus, in certain embodiments, an administrator enters a seed name to crawl. The web crawl space generation component 132 generates the set of allow rules 136. Then, the crawler component 134 is asked to fetch the seed name, using the set of allow rules. In certain embodiments, if the fetch results in a HyperText Transport Protocol (HTTP) code of 301 or 302, indicating that the targeted URL has been moved to a different location, the crawler component 134 obtains the new URL. If the fetch returns data instead of a redirect, the seed URL is validated and no further action is required. With the new URL, the web crawl space generation component 132 generates a new allow rule that is added to the set of allow rules 136. Then, the set of allow rules 136 for this seed name cover both the original seed and the new URL obtained for the redirected document.

Thus, embodiments provide automatic generation of rules to define a web crawl space to be crawled.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The computer-usable medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain embodiments may be directed to a method for deploying computing infrastructure by a person or automated processing integrating computer-readable code into a computing system, wherein the code in combination with the computing system is enabled to perform the operations of the described embodiments.

The logic of FIGS. 2-5 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2-5 may be implemented in software, hardware, programmable and non-programmable gate array logic or in some combination of hardware, software, or gate array logic.

Figure 6:
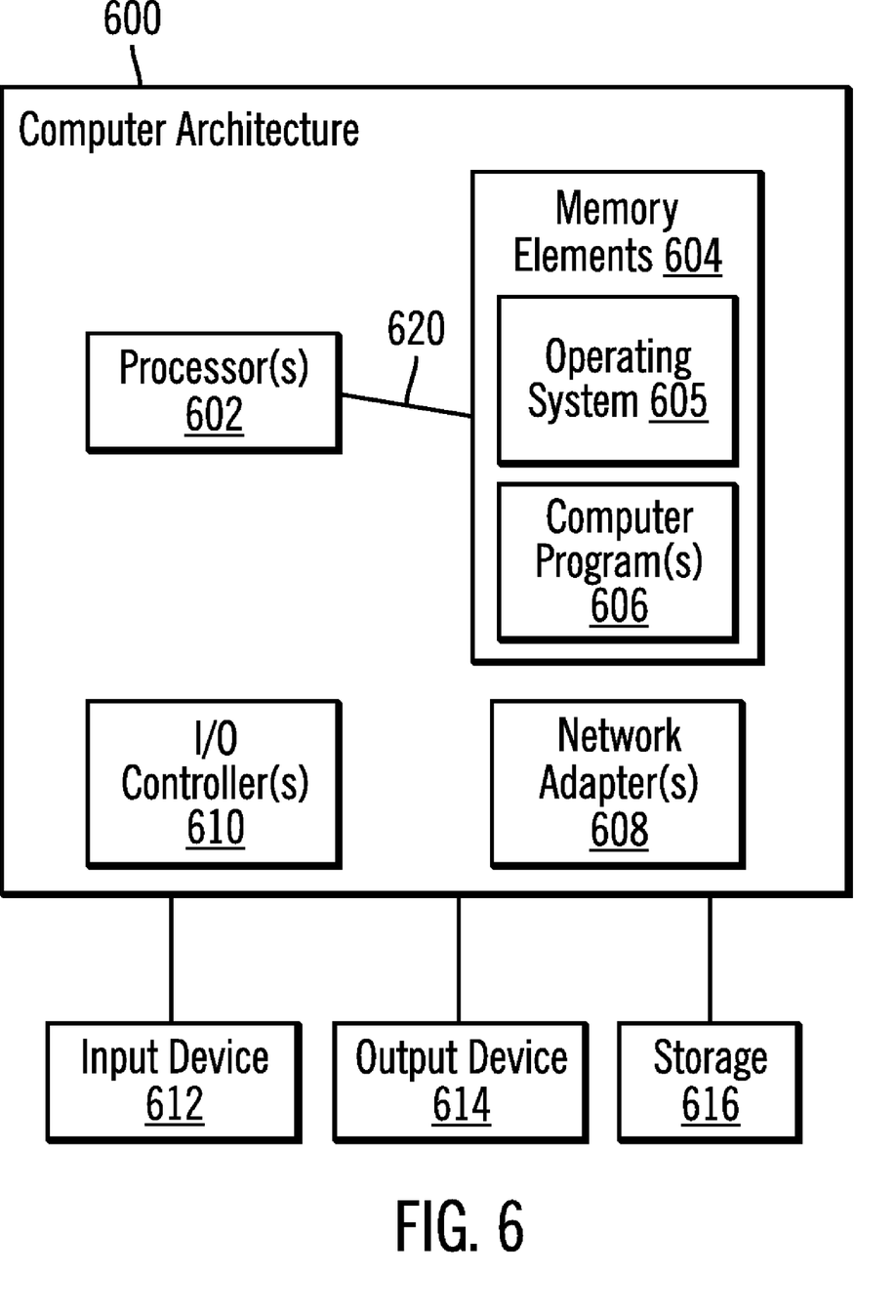
FIG. 6 illustrates a system architecture that may be used in accordance with certain embodiments.

FIG. 6 illustrates a system architecture 600 that may be used in accordance with certain embodiments. Client computer 100, server computer 120, and/or operator console 180 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method for defining a web crawl space to be crawled, comprising:

at a computer including a processor:
receiving a seed list including one or more seed names from a user, wherein each seed name represents a website with a two part name or a three part name, wherein the last part of the seed name is a top level domain name; and in response to receiving the seed list, generating a web crawl space for the received seed list by generating one or more new allow rules that determine what part of a webspace is to be crawled by:
for each of the one or more seed names,
generating a new allow rule by appending a slash and a wildcard character at an end of the seed name to allow crawling of content of the website;
determining whether the seed name has less than three parts or at least three parts;
in response to determining that the seed name has less than three parts, updating the allow rule for the seed name by appending a wildcard character and a dot before a beginning of the seed name to allow crawling of content of one or more subdomains; and
in response to determining that the seed name has at least three parts, updating the allow rule for the seed name by replacing a first portion of the seed name before a dot with a wildcard character.

2. The method of claim 1, further comprising:
attempting to fetch a document by crawling the web crawl space;
determining that the document has been moved; and
performing redirect processing by:
identifying a new seed name that represents a new location of the document; and
generating one or more additional allow rules on the new seed name to enlarge the web crawl space.

3. The method of claim 2, further comprising:
adding the one or more additional allow rules to the set of allow rules; and
crawling the web crawl space defined by the set of allow rules.

4. A computer program product comprising a computer-readable medium storing a computer readable program, wherein the computer readable program when executed by a processor on a computer causes the computer to:
receive a seed list including one or more seed names from a user, wherein each seed name represents a website with a two part name or a three part name, wherein the last part of the seed name is a top level domain name; and
in response to receiving the seed list, generate a web crawl space for the received seed list by generating one or more allow new rules that determine what part of a webspace is to be crawled by:
for each of the one or more seed names,
generating a new allow rule by appending a slash and a wildcard character at an end of the seed name to allow crawling of content of the website;
determining whether the seed name has less than three parts or at least three parts;
in response to determining that the seed name has less than three parts, updating the allow rule for the seed name by appending a wildcard character and a dot before a beginning of the seed name to allow crawling of content of one or more subdomains; and
in response to determining that the seed name has at least three parts, updating the allow rule for the seed name by replacing a first portion of the seed name before a dot with a wildcard character.

5. The computer program product of claim 4, wherein the computer readable program when executed on a computer causes the computer to:
- attempt to fetch a document by crawling the web crawl space;
- determine that the document has been moved; and
- perform redirect processing by:
  - identifying a new seed name that represents a new location of the document; and
  - generating one or more additional allow rules based on the new seed name to enlarge the web crawl space.

6. The computer program product of claim 5, wherein the computer readable program when executed on a computer causes the computer to:
- add the one or more additional allow rules to the set of allow rules; and
- crawl the web crawl space defined by the set of allow rules.

7. A system for defining a web crawl space to be crawled, comprising:
- hardware logic capable of performing operations, the operations comprising:
  - receiving a seed list including one or more seed names from a user, wherein each seed name represents a website with a two part name or a three part name, wherein the last part of the seed name is a top level domain name; and
  - in response to receiving the seed list, generating a web crawl space for the received seed list by generating one or more new allow rules that determine what part of a webspace is to be crawled by:
    - for each of the one or more seed names,
      - generating a new allow rule by appending a slash and a wildcard character at an end of the seed name to allow crawling of content of the website;
      - determining whether the seed name has less than three parts or at least three parts;
      - in response to determining that the seed name has less than three parts, updating the allow rule for the seed name by appending a wildcard character and a dot before a beginning of the seed name to allow crawling of content of one or more subdomains; and
      - in response to determining that the seed name has at least three parts, updating the allow rule for the seed name by replacing a first portion of the first seed name before a dot with a wildcard character.

8. The system of claim 7, wherein the operations further comprise:
- attempting to fetch a document by crawling the web crawl space;
- determining that the document has been moved; and
- performing redirect processing by:
  - identifying a new seed name that represents a new location of the document; and
  - generating one or more additional allow rules on the new seed name to enlarge the web crawl space.

9. The system of claim 8, wherein the operations further comprise:
- adding the one or more additional allow rules to the set of allow rules; and
- crawling the web crawl space defined by the set of allow rules.

* * * * *